United States Patent [19]
Byers et al.

[11] 3,810,348
[45] May 14, 1974

[54] SCRUBBER ARRANGEMENT

[75] Inventors: Thomas W. Byers; Francis E. Dahlem; Roy D. Ireland, Jr.; Mohiuddin Pasha, all of Louisville, Ky.

[73] Assignee: American Air Filter Company, Inc., Louisville, Ky.

[22] Filed: Jan. 7, 1972

[21] Appl. No.: 216,169

[52] U.S. Cl.......................... 55/91, 55/233, 261/98
[51] Int. Cl............................................... B01f 3/04
[58] Field of Search ............ 261/94, 98; 55/91, 233

[56] References Cited
UNITED STATES PATENTS
| | | | |
|---|---|---|---|
| 3,219,324 | 11/1965 | Williams et al. | 55/91 |
| 3,302,372 | 2/1967 | Hynson et al. | 55/91 |
| 3,350,075 | 10/1967 | Douglas | 55/91 |
| 3,432,994 | 3/1969 | Whiton et al. | 55/91 |
| 3,445,182 | 5/1969 | Tomany | 55/91 |
| 3,556,490 | 1/1971 | Bockman | 55/91 |
| 3,683,593 | 8/1972 | Kent | 55/91 |

FOREIGN PATENTS OR APPLICATIONS
| | | | |
|---|---|---|---|
| 135,468 | 8/1960 | U.S.S.R. | 55/91 |
| 144,830 | 4/1962 | U.S.S.R. | 55/91 |

Primary Examiner—Tim R. Miles
Attorney, Agent, or Firm—Robert W. Fletcher

[57] ABSTRACT

An arrangement for mutual contact of fluids wherein the fluids pass through a contact zone, and fluid contact elements are continuously cycled between the contact zone and an element treating zone where they are treated with a treating fluid and forced from the element treating zone back into the contact zone.

24 Claims, 5 Drawing Figures

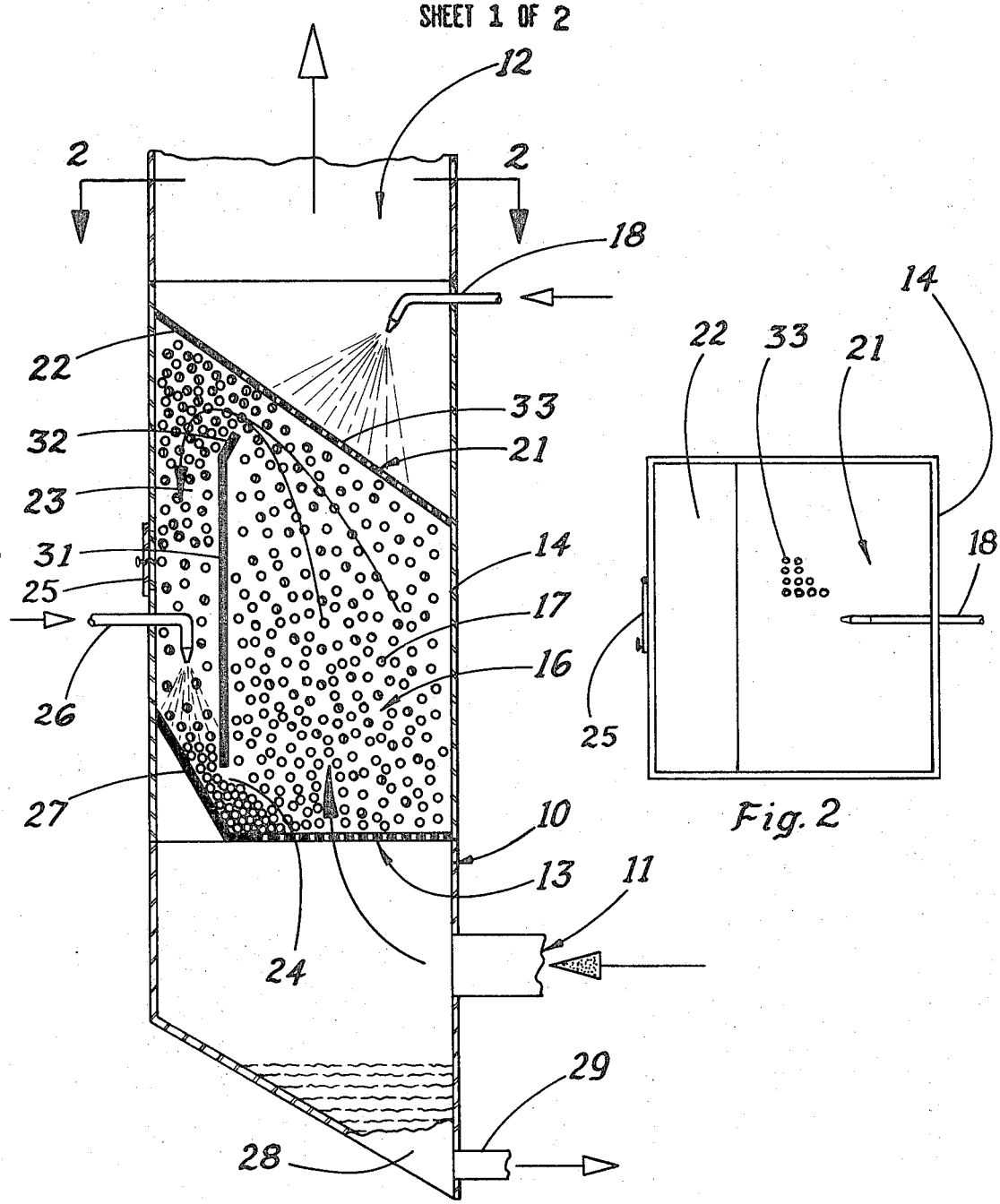

SCRUBBER ARRANGEMENT

BACKGROUND OF THE INVENTION

Many apparatus have been proposed to meet the various requirements of contacting different fluids, especially contacting gases and liquids traveling countercurrently through a contact zone. Such apparatus include, for example, spray towers wherein the gas is allowed to rise in an unobstructed space within the tower while the liquid is introduced in the form of droplets, by means of a spray nozzle or other atomizing device. These droplets are allowed to fall through the upward-flowing gas. A low pressure drop and simple construction are the advantages of this type of apparatus. However, a disadvantage of spray towers of this type is the relatively high energy requirement to form the droplets, which together with the relatively small contact surface area thus produced and the low degree of turbulence within the droplets, result in a low absorbtion efficiency. Thus, a packed tower is normally used, except in cases where plugging is possible due to the existence or formation of a solid phase.

In packed towers the liquid stream is made to flow by gravity over the surface of a packing material while the gases are made to pass in, for example, countercurrent flow to the liquid through the free spaces in the packing. In this way a large surface of contact is established between the liquid and gas. The packed tower, while suitable for many applications where gas absorbtion is described, presents a number of disadvantages which are difficult to overcome. For example, since the usual type of packing may include crushed rock, coke, or specially shaped ceramic units such as raschig rings, the tower is usually bulky. Its throughput is limited, as free passage of fluids is provided only through the interstices and voids in the packing. When the free cross-sectional area between these interstices and voids is small, the frictional pressure drop across the packing will be high and more energy will be needed to circulate the gas. Moreover, high velocities will be required for a given or described throughput of gas. A second disadvantage of packed towers is that the velocity of gas in such towers must be kept generally below a certain limit which of course, puts a limit on the throughput. The velocity limitation is necessary because if the gas velocity exceeds a certain upper limit the gas tends to prevent the liquid from flowing downwardly and may even force it, in reverse flow, out of the tower altogether. The upper limit of the gas velocity is known as the flooding point. Still another disadvantage of packed towers is that the packing in the tower tends to settle with time thus further reducing free passage of the fluids and accentuating the problems referred to above.

A type of packed tower has been proposed wherein the packing is composed of light weight spheres adapted to form a unitary floating bed in which the spheres are in contact with one another yet maintain a limited freedom of movement relative to one another. The bed as a total unit then is designed to float in the upper region of the tower where it is retained from above by a retaining grid or plate. While the action of the floating bed is substantially of the same nature as that of conventional packing, notable in that is provides a large interfacial area of contact between the liquid descending through the interstices between the spheres and the gases ascending in countercurrent flow to the liquid, it has advantages over other more conventional systems. One such advantage is that due to the rotational and slight linear movement of the balls in the bed no channeling occurs. Solid particles carried by the liquid or gas do not settle permanently on the packing, but on the contrary may be continuously washed off. Plugging is thereby reduced and there is no need for periodic shut down to clean or replace the packing. However, this type of packing still presents considerable resistance to the passage of gas and liquid and for certain gas velocities the flooding point is rapidly reached. Also, the random rotational and vibratory movements of the spheres is many times insignificant and thus they form essentially a loosely packed bed. Flow rates are then low and flooding is a constant problem.

Another type of packed tower is one that contains spherical elements but which has a very few spherical elements for the total height and cross-sectional area of the tower. The advantage in such a tower is that very high flow rates can be used. Emphasis is placed, of course, upon the spheres moving a great vertical distance without rotating or vibrating to any large extent. The disadvantage here is however, that the size of tower for the efficiency of cleaning is greatly disproportionate. Therefore, such towers are cumbersome and space consuming.

The present invention solves the above problems and overcomes the above difficulties by providing a packed tower having elements therein which circulate through a contct zone and then through an element treating zone and are ultimately forced back into the contact zone. Thus, positive scrubbing in an economical, straightforward manner is accomplished, as well as positive elimination of flooding at flow rates much higher than have heretofore been possible.

SUMMARY OF THE INVENTION

To overcome the above problems of prior scrubbers there has been developed an apparatus for providing contact between two fluids which comprises: a flow through housing having a dirty gas inlet at one end and a clean gas outlet at the opposite end defining a gas passageway therebetween, a first element restraining grid disposed across one extremity of the passageway; a second element restraining grid disposed across the other extremity of the passageway, the restraining grids allowing gas to pass therethrough; baffle means disposed within the passageway extending from a point adjacent to and spaced from the restraining grid at one extremity of the passageway to a point adjacent to and spaced from the restraining grid at the other extremity of the passageway dividing the passageway between the restraining grids into a contact zone and an element treating zone; a plurality of gas contact elements loosely disposed between the restraining grids, the elements being of a density which allows them to be maintained in a buoyant state in the contact zone and directed into the treating zone as a consequence of the gas stream entering the dirty gas inlet and passing through the restraining grids; the baffle means defining an element entrance and element exit for the treating zone between the restraining grids; at least one treating fluid inlet positioned in the treating zone adjacent the element exit to provide treating fluid to treat the elements, and force the elements from the element exit into the gas stream passing through the housing. In addition the present invention provides for a fluid inlet means in the housing adjacent one extremity thereof to introduce a fluid stream into the gas stream passing through the housing and a fluid exit means for removal of fluid therefrom.

DESCRIPTION OF THE DRAWINGS

FIG. 1 is a cross-sectional elevational view of one embodiment of the present invention.

FIG. 2 is a plan view taken in a horizontal plane through line 2—2 of FIG. 1.

DESCRIPTION OF THE PREFERRED EMBODIMENT

Figures 3, 4, 5:
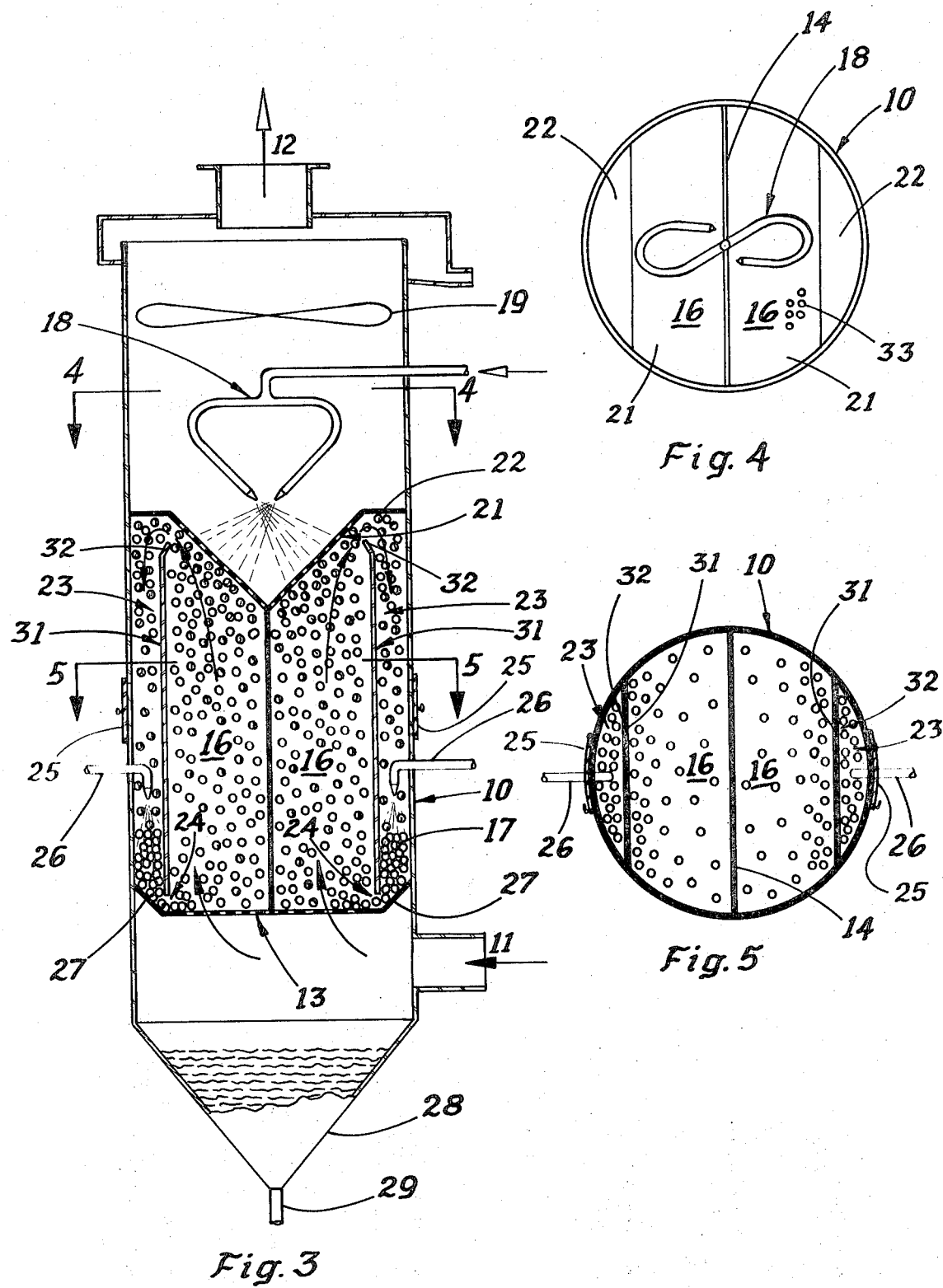
FIG. 3 is a cross-sectional elevational view of a second embodiment of the present invention.
FIG. 4 is a cross-sectional plan view of the apparatus of FIG. 3 taken in a horizontal plane through line 4—4 of FIG. 3; and, FIG. 5 is a cross-sectional plan view of the apparatus of FIG. 3 taken in a horizontal plane through line 5—5 of FIG. 3.

In FIG. 1 there is shown a flow-through housing 10 having dirty gas inlet 11 at one end thereof and clean gas outlet 12 at the other. A dirty gas stream enters housing 10 and passes through a first restraining grid 13 extending across one extremity of housing 10. The dirty gas stream then passes into contact zone 16 where it contacts gas contact elements 17, which advantageously are substantially spherical in shape. Substantially spherical elements 17 are coated in a manner described hereinafter with a thin film of scrubbing liquid from either treating fluid inlets 26 or nozzle means 18 or both. Upon contacting substantially spherical elements 17 the dirty gas is cleaned, since the thin film of scrubbing liquid coated thereon either causes particulate matter to adhere thereto, or alternatively, chemically reacts with the impurities in the gas stream. Substantially spherical elements 17 are buoyed upwardly toward a second restraining grid 21 which is positioned to direct their flow out of the gas stream. In many cases, substantially spherical elements 17 are directed out of the gas stream without actually contacting second restraining grid 21. Directing of elements 17 out of the gas stream without contact with grid 21 may be the result of several factors. One factor is the blocking effect of other elements 17 which block the path of a given substantially spherical element 17 and take the place of second restraining grid 21 to effectively direct the substantially spherical element 17 into element treating zone 23. Another factor may be that the gas which is being, or has been, cleaned may tend to flow along the inclined surface of second restraining grid 21 before passing therethrough. There may therefore be a laminar flow of gas which directs substantially spherical elements 17 upwardly along the inclined surface to ultimately be directed into element treating zone 23, without contacting second restraining grid 21. A third factor is the force that the scrubbing liquid emitted from nozzle means 18 exerts upon substantially spherical elements 17. Under certain conditions this force may be sufficient to keep substantially spherical elements 17 from contacting second restraining grid 21. It should be noted in this regard that the velocity and therefore the force of the scrubbing liquid emitted from nozzle means 18 increases as the distance from nozzle means 18 decreases. Therefore, the closer the substantially spherical elements 17 get to nozzle means 18 the more force is exerted downwardly thereupon.

When substantially spherical elements 17 reach the region of contact zone 16 near upper portion 22 of second restraining grid 21 they no longer realize an upward lift from the dirty gas stream since upper portion 22 is gas impervious. The result is that substantialy spherical elements 17 fall by gravity into element treating zone 23 which is formed by baffle means 31 dividing the portion of housing 10 between first and second restraining grids into a contact zone and the element treating zone. Substantially spherical elements 17 continue to fall downwardly in element treating zone 23, past at least one treating fluid inlet 26, which is preferably emitting a scrubbing liquid, rather than a scrubbing gas, until they reach the lower portion thereof. At the lower portion of element treating zone 23, there exists element exit 24. Directly below element exit 24 is first restraining grid 13 having integral therewith, fluid impervious portion 27. Fluid impervious portion 27 prevents the dirty gas stream from overcoming the force exerted by the scrubbing liquid from treating fluid nozzles 26 on substantially spherical elements 17, and forcing them upwardly in element treating zone 23. It thereby prevents a reversal of the circular flow of substantially spherical elements 17 between contact zone 16 and element treating zone 23. The scrubbing liquid from treating fluid inlet 26 cleans the substantially spherical elements 17 leaving them coated with a thin film of the scrubbing liquid, and forcing them again into the dirty gas stream. The scrubbing liquid from scrubbing liquid inlet 26, as well as the scrubbing liquid from nozzle means 18, drains downwardly and is collected in reservoir 28 of housing 10, from which it may be withdrawn through drain 29.

The operation of either of the embodiments of this invention shown in FIGS. 1 and 3 respectively is identical. Referring to the embodiment of FIG. 3, the dirty gas stream enters through dirty gas inlet 11 and travels upwardly through first restraining grid 13 to contact gas contact elements 17 which are preferably substantially spherical in shape. Substantially spherical elements 17 have coated thereon a thin film of scrubbing liquid. If nozzle means 18 is employed, which is preferably the case, this thin film of liquid is due in part to the scrubbing liquid which is emitted from treating fluid inlets 26, and in part, to the scrubbing liquid which is introduced into housing 10 through nozzle means 18. In many applications the two liquids will be identical and from the same supply line; however, in many other applications it may be desirable to use two different liquids. For example, in the removal of sulfur dioxide it may be desirable to formulate a liquid to be introduced through nozzle means 18 which contains a high concentration of calcium carbonate, with a view toward reacting the calcium carbonate chemically with the $SO_2$ of the dirty gas to form calcium sulfate. The calcium sulfate is a solid which can then be removed by, for example, a spray of water from treating fluid inlets 26. When the same liquid is used in both nozzle means 18 and treating fluid inlets 26 there is established a nearly constant amount of fresh scrubbing liquid on the substantially spherical elements throughout the scrubber. This nearly constant amount of fresh scrubbing liquid results from introducing fresh scrubbing liquid onto the substantially spherical elements at the bottom of the scrubber and simultaneously introducing fresh scrubbing liquid onto the substantially spherical elements at the top of the scrubber. The result of such simultaneous introduction is a relatively constant propensity for particle removal from the dirty gas stream, or chemical reaction of contaminates in the dirty gas stream, throughout the entire contact zone of the scrubber. Hence, the total scrubbing efficiency is much greater than if the same total volume of fresh scrubbing liquid is introduced separately from either treating fluid inlets 26 or nozzle means 18.

Removal of foreign material from substantially spherical elements 17 is accomplished by passing them through element treating zone 23 which is defined by baffle means 31 in housing 10. In the embodiment shown in FIG. 1 the baffle means is a vertical sheet member extending generally longitudinally to the gas flow in rectangular housing 10, while in FIGS. 3–5 baffle means 31 are essentially sheets in chord-like position extending generally longitudinally in circular housing 10. Again referring to FIG. 3, baffle means 31 define and separate contact zone 16 from element treating zones 23. Baffle means 31 desirably have upper inwardly tapered portions 32 which facilitate directing substantially spherical elements 17 into element treating zones 23. Similarly as in FIG. 1, the substantially spherical elements 17 are buoyed upwardly by the dirty gas stream and are directed outwardly by second restraining grid 21 until they arrive at a point in contact zone 16 just below portion 22 of second restraining grid 21. Upper portion 22 of second restraining grid 21 is not perforated, therefore, the flow of gas therethrough is prevented. Since the flow is prevented substantially spherical elements 17 fall downwardly due to gravity and are directed by portion 32 of baffle means 31 into element treating zones 23. The substantially spherical elements 17 fall past treating fluid inlets 26, and as they do so they are subjected to a stream of scrubbing liquid directed therefrom. This scrubbing liquid stream cleans the substantially spherical elements 17 and carries the removed material along with it as it drains downwardly into reservoir 28. A portion of the scrubbing liquid stream, remains as, a thin film of liquid on substantially spherical elements 17. The scrubbing liquid stream also imparts motion to the substantially spherical elements 17 which prevents them from accumulating in element treating zones 23. This accumulation is most likely to occur if foreign material, for example calcium sulfate, is adhering to the surface of the substantially spherical elements 17, since newly formed calcium sulfate is very cement-like and tacky in composition. It should be particularly noted that the substantially spherical elements 17 move continuously in a circular path rather than form a loosely packed bed congested against the underside of second restraining grid 21 inside contact zone 16. On the other hand, it is not the object of this invention to prevent substantially spherical elements 17 from contacting second restraining grid 21. Second restraining grid 21 is designed to continuously direct substantially spherical elements 17 in the upper part of contact zone 16 into element treating zones 23. Also although some rotation of each of these substantially spherical elements 17 does take place about their respective axes, it is not a specific object of this invention to utilize this rotational aspect to accomplish the liquid gas contact described herein.

One very practical advantage of continuously cycling substantially spherical elements 17 is that access means 25 may be provided for addition or removal of elements as may be desired without interrupting the scrubbing operation. It is also possible to make regular inspections of the spheres without interrupting the scrubbing operation or to even remove a number of the elements for cleaning.

While it is conceived that other shapes for second restraining grid 21 may be employed, for example, sloping upwardly or downwardly, a simple V-shaped downwardly pointed grid having an angle between the inclined surfaces of about 90° is found to be highly effective when employed in conjunction with upper portions 22 which have no perforations. The openings 33 in second restraining grid 21 are preferably as large as possible. The function of the grid is essentially only to prevent upward escape of gas contact elements 17 and direct them into scrubbing zones 23. The barrier should therefore be relatively thin; that is, the thickness in a vertical direction should generally be less than half the width of an opening 33. Such a selected thickness tends to avoid a tendency in some cases for thick barriers to accelerate the gas so that the upper layer of gas contact elements is held firmly against the second restraining grid 21. In this same regard, it should be noted that if a round housing is employed as in FIG. 3 the substantially spherical elements 17 will be in the greatest concentration adjacent the inner periphery of contact zone 16. Therefore, it may be desirable to contour second restraining grid 21 in a manner which facilitates a greater flow of substantially spherical elements 17 entering element treating zones 23 along the periphery of housing 10 rather than directly from the center. One possibility is to incline the upper portions 32 of baffle means 31 downwardly near their points of attachment to the sidewalls of housing 10 to facilitate a greater concentration of substantially spherical elements 17.

Further it may be desirable, however not necessary in the embodiment of FIG. 3, to provide a partition 14 in contact zone 16. Partition 14 can typically extend vertically from first restraining grid 13 to second restraining grid 21. Arranged in such a manner partition 14 essentially divides contact zone 16 into two parts thus promoting the circular flow of substantially spherical elements 17. As shown in the figures, partition 14 may extend from first restraining grid 13 where it is equidistant from either element treating zone 23 to a point of attachment at the apex of second restraining grid 21. In such instance it may be desirable to provide that the apex of second restraining grid 21 be gas impervious, to further enhance and promote a circular path for the substantially spherical elements 17.

Also, it should be noted that in the embodiment of FIG. 3, nozzle means 18 is preferably comprised of two nozzles each of which has its longitudinal axis essentially normal to a different inclined surface of second restraining grid 21. Such an arrangement directs maximum force against substantially spherical elements 17 as they approach grid 21, and at the same time, functions to keep openings 33 clean and unobstructed. It is also most efficient to have nozzles 34 arranged in different, generally parallel, vertical planes so that the scrubbing liquid emitted from one does not interfere with scrubbing liquid emitted from the other and destroy the advantageous downward forces acting upon the substantially spherical elements adjacent the underside of the second restraining grid.

It may also be desirable to employ swirl veins 19 or other similar water removing means above the second restraining grid and nozzle means to remove liquid droplets from the cleaned gas stream. Swirl veins are specifically mentioned herein, however it will be recognized by those skilled in the art that many other means can be substituted to remove liquid droplets. It may be further desirable to include a centrifugal water eliminator further upstream from the droplet removal means.

In accordance with the novel features of this invention, it is important to note that there is considerable latitude allowed in locating each treating fluid inlet 26 in its respective element treating zone 23. Two of the most significant criteria which determine the positioning of treating fluid inlets are:

1. Treating fluid inlets 26 must be positioned in such a manner that some motion is imparted to gas contact elements 17 by virtue of treating fluid emitted therefrom, so that gas contact elements 17 are not allowed to become jammed and congested or bonded together by cement-like foreign matter adhering to their outer surfaces; and 2. Treating fluid inlets 26 must be positioned in such a manner that treating fluid emitted therefrom causes gas contact elements 17 to be forced in a direction countercurrent to the entering gas stream in element treating zones 23. Within these broad limitations many variations on the location of treating fluid inlets 26 are possible all of which are intended to be incorporated herein.

The gas contact elements, preferably substantially spherical elements 17, described herein should be present in sufficient number to provide a continuous flow in a circular path. They should not be so numerous that they form a floating bed in contact zone 26 held in place by perforated barrier 21. Nor should they be so numerous that they do not cycle freely between the contact zone and the element treating zone, since there then would exist the possibility that they would have time enough to have a cement-like material for example, calcium sulfate, set-up on their surfaces and prevent further cycling thereof. The maximum number of gas contact elements can best be given by reference to their apparent packed volume. They should have an apparent packed volume (i.e., their volume measured in their settled condition, compared to the total volume of contact zone 16) of less than 95 percent. Correspondingly, it will be noted that there is a lower limit to the apparent packed volume of gas contact elements 17, for if too few are employed no significant continuous circular motion will be present, but instead they will be buoyed upwardly in a random fashion throughout contact zone 16. Preferably gas contact elements 17 should have an apparent packed volume of between about 10 and 80 percent, and most preferably between 40 and 65 percent.

It will be readily understood that maintenance of the desired type of motion of the gas contact elements 17 will depend very closely upon the fluid velocities, and particularly on the velocity of the incoming dirty gas. With very low gas velocities there may not be sufficient lift for the gas contact elements 17 to be buoyed off the bottom restraining grid 13. This may be particularly so where the densities of the elements are high and where the rate of liquid flow in the opposite direction to that of the gas flow is relatively high. On the other hand when the gas velocities are high there is the possibility of lodging some or all of the gas contact elements against second restraining grid 21 even where their quantity is well within the limits described above. It will be seen however, that the gas and liquid flow rates in the present invention are equal to or exceed the flow rates obtained in prior art scrubbers having few spherical elements, and thus, far less liquid to gas contact. Specifically, the gas velocities used with the present invention are in the range of about 300 to 1,800 feet per minute, while the liquid rate from nozzle means 18 is in the range of about 5 to 100 U.S. gallons per minute per square foot. Preferably these rates will be in the range of 500 to 1,700 feet per minute and 10 to 75 U.S. gallons per minute per square foot, respectively. Correspondingly the flow rate of scrubbing liquid from treating fluid nozzles 26 should preferably be in the range of about 0.01 to 100 gallons per minute with a range of between about 1.0 and 25 gallons per minute being most preferred. As a result of such higher velocity not only is throughput or capacity of the apparatus considerably increased but also absorbtion efficiency is markedly improved. Also recovery of the gas constituents is improved, which may be the purpose of the operation.

Further, consistent with the advantages of this invention, it should be noted that gas contact elements 17 may be made of various materials. Preferably they are hollow, thin walled balls of plastic or other synthetic resin or the like. Alternatively, other low density construction may be employed such as various foamed plastics or other foamed materials having an impervious external surface. In some cases hollow or low density spheres of metal may be used, or conceivably, inflated plastic balls with a very thin wall containing gas under pressure may be used to provide elements of extremely low density. Also it is to be understood however that no strict limitation as to the shape of the gas contact elements is intended by the use of the term, "substantially spherical," in describing the preferred embodiment and that egg-shaped or slightly oblong elements may be quite suitable. The gas contact elements may be of a size up to about 4 inches in diameter or more, but will generally be smaller, the optimum size being best selected empirically based upon the total size of the scrubber in which they are to be used. These gas contact elements will also generally be of low density so that they can be buoyed upwardly by the flow of dirty gas through contact zone 16. The term density is intended to mean the apparent density of the individual gas contact elements. The apparent density can be ascertained by dividing the weight of an element by the volume defined by its outer wall. Most desirable in the apparatus of this invention are gas contact elements having densities greater than the density of the dirty gas and less than the density of the scrubbing liquid. As a specific numerical range densities between 0.1 grams per cubic centimeter gms/cc and about 0.9 gms/cc will be generally selected.

It has been found desirable to employ gas contact elements 17 of different densities, since such a combination of heavier or lighter elements result in a more pronounced more controlable circular movement thereof. Generally identically sized gas contact elements having two different densities are preferred. However, it is alternatively acceptable that the elements be of two different sizes and of the same density. In such cases, increased frictional forces and lift cause the larger elements to be buoyed upwardly more rapidly. Such an arrangement gives a more controlable circular movement.

It may also be desirable in certain applications of the apparatus of this invention to employ a foaming agent such as Azodicarbonamide, which has the chemical name 1,1-Azobisformamide. Such a foaming agent may cause foaming of the scrubbing liquid and thereby further enhance liquid gas contact on the surface of each of gas contact elements 17 by virtue of the fact that there is a thin foam film thereon. In other cases it may be necessary or desirable to reduce the amount of foaming in contact zone 16. In such cases it may be necessary or desirable to include a surfactant in the scrubbing liquid.

Further in accordance with the principles of this invention it can readily be seen that by varying the flow of the treating fluid through treating fluid inlets 26 the velocity of the substantially spherical elements can be controlled as they travel in their circular path through the element contact zone and through the element treating zone.

Having described the invention herein what is claimed is:

1. An apparatus for providing contact between fluids which comprises:
    a flow through housing having a dirty gas inlet at one end and a clean gas outlet at the opposite end defining a gas passageway therebetween;
    a first element restraining grid disposed across one extremity of said passageway;
    a second element restraining grid disposed across the other extremity of said passageway, said restraining grids allowing gas to pass therethrough;
    baffle means disposed within said passageway extending from a point adjacent to and spaced from the restraining grid at one extremity of said passageway to a point adjacent to and spaced from the restraining grid at the other extremity of said passageway dividing said passageway between said restraining grids into a contact zone and an element treating zone;
    a plurality of gas contact elements loosely disposed between said restraining grids, said contact elements being of a density which allows them to be maintained in a buoyant state in said contact zone and directed into said treating zone as a consequence of a gas stream entering said dirty gas inlet and passing through said restraining grids; said baffle means defining an element entrance and an element exit for said treating zone between said restraining grids, at least one treating fluid inlet positioned in said treating zone adjacent said element exit to provide treating fluid to treat said contact elements and to force said contact elements from said element exit into said gas stream passing through said housing.

2. An apparatus for providing interphase contact between a liquid and a gas which comprises:
    a flow-through housing having a dirty gas inlet at its lower end and a clean gas outlet at its upper end defining a gas passageway therebetween;
    a first element restraining grid disposed across said lower end of said housing above said dirty gas inlet;
    a second element restraining grid disposed across said upper end of said housing below said clean gas outlet, said second element restraining grid allowing gas to pass through only certain portions thereof;
    baffle means attached to the inside of said housing and extending generally vertically from a point adjacent to and spaced from said first element restraining grid to a point adjacent to and spaced from said second element restraining grid;
    said baffle means dividing the passageway between the restraining grids into a contact zone and an element treating zone;
    a plurality of substantially spherical elements confined within said contact zone and said element treating zone, said substantially spherical elements being of a density which allows them to be buoyed upwardly in said contact zone and directed into said element treating zone as a consequence of a gas stream entering said dirty gas inlet and passing through said first and second restraining grids;
    said baffle means defining an element entrance and an element exit between its upper and lower ends and said restraining grids;
    at least one treating fluid inlet positioned in said element treating zone above said element exit to provide scrubbing liquid to scrub said substantially spherical elements, to deposit a thin layer of scrubbing liquid thereon and to force said substantially spherical elements from said element exit into the gas stream passing through said housing;
    nozzle means attached above said second restraining grid yet below said clean gas outlet to provide a scrubbing liquid stream in countercurrent flow to said gas stream passing through said housing;
    scrubbing liquid exit means located in the lower portion of said housing for removal of scrubbing liquid therefrom.

3. The apparatus of claim 2 wherein said second restraining grid comprises a gas impervious portion located above said element treating zone.

4. The apparatus of claim 2 wherein said treating fluid inlet is a nozzle.

5. An apparatus for providing interphase contact between a liquid and a gas which comprises:
    a flow-through housing having a dirty gas inlet at its lower end and a clean gas outlet at its upper end defining a gas passageway therebetween;
    a first element restraining grid disposed across said lower end of said housing above said dirty gas inlet;
    a second element restraining grid disposed across said upper end of said housing below said clean gas outlet, said second element restraining grid allowing gas to pass through only certain portions thereof;
    at least two baffle means attached to the inside of said housing extending vertically from a point adjacent to and spaced from said first element restraining grid at the lower end of said housing to a point adjacent to and spaced from said second element restraining grid;
    said restraining grids and said baffle means defining a contact zone and at least two element treating zones;
    a plurality of substantially spherical elements confined within said contact zone and element treating zones, said substantially spherical elements being of a density which allows them to be buoyed upwardly in said contact zone and directed into said element treating zones as a consequence of a gas stream entering said dirty gas inlet and passing through said first and second element restraining grids;

each of said baffle means defining an element entrance and an element exit between their respective upper and lower ends and said element restraining grids;

at least one treating fluid inlet positioned in each of said element treating zones above said element exits to provide scrubbing liquid to scrub said substantially spherical elements, to deposit a thin layer of scrubbing liquid thereon and to force said substantially spherical elements from said element exits into said gas stream passing through said housing;

nozzle means attached above said second restraining grid yet below said clean gas outlet to provide a scrubbing liquid stream in countercurrent flow to said gas stream passing through said housing;

scrubbing liquid exit means located in the lower portion of said housing for removal of scrubbing liquid therefrom.

6. The apparatus of claim 5 wherein said second restraining grid is generally V-shaped with its apex pointing countercurrent to the flow of said gas stream.

7. The apparatus of claim 6 wherein said V-shaped second restraining grid includes, gas impervious portions located above each of said element treating zones.

8. The apparatus of claim 7 comprising a generally vertical partition attached to said apex of said V-shaped second restraining grid and extending downwardly to join said first restraining grid.

9. The apparatus of claim 8 wherein said apex of second restraining grid is nonperforated.

10. The apparatus of claim 6 wherein said nozzle means is comprised of two nozzles each of which has its longitudinal axis essentially normal to a different inclined surface of said V-shaped second restraining grid and lies in one of two different, generally parallel vertical plane.

11. The apparatus of claim 5 wherein said treating fluid inlets are nozzles.

12. The apparatus of claim 5 wherein said first restraining grid comprises fluid impervious portions located below said element treating zones.

13. The apparatus of claim 5 comprising water removing means contained within and attached to said housing above said second restraining grid barrier and said nozzle means to remove liquid droplets from the gas stream.

14. The apparatus of claim 13 wherein said water removing means comprises swirl veins.

15. The apparatus of claim 5 wherein a portion of said substantially spherical elements have a first diameter and the remainder have a second diameter, and said substantially spherical elements are of a constant density within the range of between 0.1 and 0.9 grams per cubic centimeter.

16. The apparatus of claim 5 wherein substantially spherical elements are all of the same diameter, and a portion of said substantially spherical elements are of one density and the remainder are of a second density, both densities being within the range of between 0.1 and 0.9 grams per cubic centimeter.

17. A process for mutually contacting a gas and liquid comprising: passing a stream of upwardly flowing gas and a stream of downwardly flowing liquid through a contact zone of a housing; maintaining in said gas stream a substantially continuously moving bed of gas contact elements having a density less than that of said liquid and greater than that of said gas; directing said gas contact elements into an element treating zone wherein substantially no upwardly flowing gas is present by means of a shaped first element restraining grid at the upper end of said contact zone, said treating zone being defined by baffle means extending vertically from a point adjacent to and spaced from a second element restraining grid at the lower end of said housing to a point adjacent to and spaced from said first element restraining grid; scrubbing, moving and coating said gas contact elements in said element treating zone by directing a treating fluid onto said gas contact elements in said element treating zone, whereby said gas contact elements are, freed of foreign material, coated with a thin film of liquid, and moved again into said stream of upwardly flowing gas; said step of maintaining a substantially continuously moving bed in said contact zone being effected by passing said upward stream of gas at sufficient velocity to provide upward lift to said gas contact elements, said upward lift being sufficient to cause said elements to move upwardly thereby causing the contact elements to be moved continuously in a circular path through the contact zone and the treating zone.

18. The process of claim 17 wherein said step of directing said gas contact elements into said element treating zone is effected in part by passing said downwardly flowing liquid through said restraining grid with sufficient velocity to prevent said gas contact elements adjacent thereto from becoming congested thereunder.

19. The process of claim 18 wherein the flow rate of said gas is between about 300 and about 1,800 feet per minute and the countercurrent flow of said liquid is between about 5 and about 100 U.S. gallons per minute per square foot of cross-section of said contact zone.

20. The process of claim 18 wherein the flow rate of said gas is between about 550 and about 1,700 feet per minute and the countercurrent flow of said liquid is between about 10 and 75 U.S. gallons per minute per square foot of cross-section of said contact zone.

21. The process of claim 18 wherein contacting said gas and said liquid in countercurrent flow comprises passing said gas upwardly through said contact zone at a rate of 300 to 1,800 lineal feet per minute and passing said liquid downwardly at a rate of between about 5 and 100 U.S. gallons per minute per square foot of cross-section of said contact zone, and wherein said step of maintaining a continuously moving bed of gas contact elements within said contact zone is effected by (a) employing a total apparent packed volume of said elements of less than 95 percent of the volume of said contact zone, and (b) maintaining and coordinating the relative flow rates of said gas and said liquid so that said elements are continuously moved in a circular path through said contact zone and said element treating zone whereby contact of said gas and liquid in said contact zone is achieved.

22. The process of claim 21 wherein the apparent packed volume of said gas contact elements is in the range of between 10 and 80 percent.

23. The process of claim 21 wherein the apparent packed volume of said gas contact elements is in the range of between 40 and 65 percent.

24. A process for mutually contacting a gas and liquid comprising: passing a stream of upwardly flowing gas and a stream of downwardly flowing liquid through a contact zone of a housing; maintaining in said gas stream a substantially continuously moving bed of gas contact elements having a density less than that of said liquid and greater than that of said gas; directing said gas contact elements into an element treating zone wherein substantially no upwardly flowing gas is present by means of a first shaped element restraining grid at the upper end of said contact zone inclined at a suitable angle to promote the movement of said contact elements into said element treating zone, said treating zone being defined by baffle means extending vertically from a point adjacent to and spaced from said first element restraining grid at the upper end of said housing to a point adjacent to and spaced from a second element restraining grid at the lower end of said housing; passing said gas contact elements through said element treating zone back into said stream of upwardly flowing gas at the lower end of said housing; said step of maintaining a substantially continuously moving bed in said contact zone being effected by passing said upward stream of gas at sufficient velocity to provide upward lift to said gas contact element, said upward lift being sufficient to cause said elements to move upwardly and outwardly, thereby causing the contact elements to be moved continuously in a circular path through the contact zone and the treating zone, said step of directing said gas contact elements into said element treating zone being effected in part by passing said downwardly flowing liquid through said restraining grid with sufficient velocity to prevent said gas contact elements adjacent thereto from becoming congested thereunder.

* * * * *